United States Patent
Zhu et al.

(10) Patent No.: US 11,686,827 B2
(45) Date of Patent: *Jun. 27, 2023

(54) ADAPTIVE CODING FOR LIDAR SYSTEMS

(71) Applicant: Hesai Technology Co., Ltd., Shanghai (CN)

(72) Inventors: Xuezhou Zhu, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 463 days.

This patent is subject to a terminal disclaimer.

(21) Appl. No.: 16/803,805

(22) Filed: Feb. 27, 2020

(65) Prior Publication Data

US 2020/0271764 A1 Aug. 27, 2020

Related U.S. Application Data

(63) Continuation of application No. 16/539,240, filed on Aug. 13, 2019, now Pat. No. 10,620,302, which is a (Continued)

(30) Foreign Application Priority Data

Jun. 27, 2018 (CN) .......................... 201810678690.4

(51) Int. Cl.
*G01S 7/48* (2006.01)
*G01S 7/4865* (2020.01)
(Continued)

(52) U.S. Cl.
CPC .......... *G01S 7/4865* (2013.01); *G01S 7/4873* (2013.01); *G01S 17/10* (2013.01)

(58) Field of Classification Search
USPC ....................................................... 356/5.01
See application file for complete search history.

(56) References Cited

U.S. PATENT DOCUMENTS

| 5,157,451 A | 10/1992 | Taboada et al. |
| 5,250,810 A | 10/1993 | Geiger |

(Continued)

FOREIGN PATENT DOCUMENTS

| CN | 101718863 A | 6/2010 |
| CN | 102638271 A | 8/2012 |

(Continued)

OTHER PUBLICATIONS

Partial European Search Report issued in European Patent Application No. 18924237.3 dated Mar. 3, 2022.

(Continued)

*Primary Examiner* — James R Hulka
(74) *Attorney, Agent, or Firm* — Wilson Sonsini Goodrich & Rosati

(57) ABSTRACT

A Lidar system is provided. The Lidar system comprise: a light source configured to emit a multi-pulse sequence to measure a distance between the Lidar system and a location in a three-dimensional environment, and the multi-pulse sequence comprises multiple pulses having a temporal profile; a photosensitive detector configured to detect light pulses from the three-dimensional environment; and one or more processors configured to: determine a coding scheme comprising the temporal profile, wherein the coding scheme is determined dynamically based on one or more real-time conditions including an environment condition, a condition of the Lidar system or a signal environment condition; and calculate the distance based on a time of flight of a sequence of detected light pulses, wherein the time of flight is determined by determining a match between the sequence of detected light pulses and the temporal profile.

20 Claims, 7 Drawing Sheets

Related U.S. Application Data continuation of application No. 16/175,274, filed on Oct. 30, 2018, now Pat. No. 10,466,342, which is a continuation of application No. PCT/CN2018/109049, filed on Sep. 30, 2018.

(51) Int. Cl.
  *G01S 17/10* (2020.01)
  *G01S 7/487* (2006.01)

(56) References Cited

U.S. PATENT DOCUMENTS

| | | | |
|---|---|---|---|
| 8,072,582 | B2 | 12/2011 | Meneely et al. |
| 8,094,081 | B1* | 1/2012 | Bruzzi ............... H01Q 13/0208 343/781 CA |
| 9,520,953 | B2* | 12/2016 | Burchard ............. G01S 7/4876 |
| 10,466,342 | B1 | 11/2019 | Zhu et al. |
| 10,527,727 | B2* | 1/2020 | Bondy .................. G01S 17/89 |
| 10,620,302 | B2 | 4/2020 | Zhu et al. |
| 10,627,490 | B2* | 4/2020 | Hall .................... G01S 17/42 |
| 10,859,700 | B2* | 12/2020 | Ngai .................... G01S 7/484 |
| 10,969,475 | B2* | 4/2021 | Li ....................... G01S 7/484 |
| 11,047,982 | B2* | 6/2021 | Hassibi ............... G01S 7/4817 |
| 11,059,478 | B2* | 7/2021 | Sims, III ............. G05D 1/0276 |
| 11,346,952 | B2* | 5/2022 | Pan ..................... G01S 7/4868 |
| 2010/0045965 | A1* | 2/2010 | Meneely .............. G01S 17/10 356/5.01 |
| 2010/0157280 | A1 | 6/2010 | Kusevic et al. |
| 2012/0002973 | A1 | 1/2012 | Bruzzi et al. |
| 2014/0369225 | A1 | 12/2014 | Burchard |
| 2017/0090031 | A1 | 3/2017 | Bondy et al. |
| 2017/0219695 | A1 | 8/2017 | Hall et al. |
| 2017/0307736 | A1 | 10/2017 | Donovan |
| 2017/0307758 | A1 | 10/2017 | Pei et al. |
| 2018/0031703 | A1 | 2/2018 | Ngai et al. |
| 2018/0188358 | A1 | 7/2018 | Li et al. |
| 2020/0003877 | A1* | 1/2020 | Zhu ..................... G01S 7/4865 |
| 2020/0114907 | A1* | 4/2020 | Sims, III ............. B60W 30/085 |
| 2020/0200910 | A1* | 6/2020 | Pan ..................... G01S 7/484 |
| 2021/0041562 | A1* | 2/2021 | Hassibi ............... G01S 17/10 |

FOREIGN PATENT DOCUMENTS

| | | |
|---|---|---|
| CN | 103197321 A | 7/2013 |
| CN | 103616696 A | 3/2014 |
| CN | 103885065 A | 6/2014 |
| CN | 104035097 A | 9/2014 |
| CN | 105182361 A | 12/2015 |
| CN | 105656617 A | 6/2016 |
| CN | 107728156 A | 2/2018 |
| CN | 108415028 A | 8/2018 |
| WO | WO-2018050906 A2 | 3/2018 |
| WO | WO-2020000755 | 1/2020 |

OTHER PUBLICATIONS

PCT/CN2018/109049 International Search Report and Written Opinion dated Apr. 1, 2019.
U.S. Appl. No. 16/175,274 Notice of Allowance dated Oct. 3, 2019.
U.S. Appl. No. 16/539,240 Notice of Allowance dated Feb. 20, 2020.
U.S. Appl. No. 16/539,240 Notice of Allowance dated Jan. 14, 2020.
U.S. Appl. No. 16/175,274 Notice of Allowance dated Jul. 17, 2019.
U.S. Appl. No. 16/175,274 Office Action dated Apr. 22, 2019.
U.S. Appl. No. 16/175,274 Office Action dated Feb. 13, 2019.
U.S. Appl. No. 16/539,240 Office Action dated Sep. 12, 2019.
Extended European Search Report issued in European Patent Application No. 18924237.3 dated Jul. 11, 2022.

* cited by examiner

ADAPTIVE CODING FOR LIDAR SYSTEMS

CROSS-REFERENCE

This application is a Continuation Application of U.S. application Ser. No. 16/539,240, filed Aug. 13, 2019, which is a Continuation Application of U.S. application Ser. No. 16/175,274, filed Oct. 30, 2018, which claims priority to International PCT Application No. PCT/CN2018/109049, filed on Sep. 30, 2018, which claims the benefit of Chinese Application No. CN201810678690.4, filed Jun. 27, 2018, each of which is entirely incorporated herein by reference.

BACKGROUND OF THE INVENTION

Lidar (light detection and ranging) technology can be used to obtain three-dimensional information of an environment by measuring distances to objects. A Lidar system may include at least a light source configured to emit a pulse of light and a detector configured to receive returned pulse of light. The returned pulse of light or light beam may be referred to as echo light beam. Based on the lapse time between the emission of the pulse of light and detection of returned pulse of light (i.e., time of flight), a distance can be obtained. The pulse of light can be generated by a laser emitter then focused through a lens or lens assembly. The returned pulse of light may be received by a detector located near the laser emitter. The returned pulse of light may be scattered light from the surface of an object.

In some cases, confusion between return pulses may occur which may introduce incorrect measurements of distance. For example, scattered light from another pulse transmitted by the same Lidar system or by a second Lidar system in proximity to the LiDAR system may mistakenly be paired with the original pulse light, which may lead to an incorrect measurement. Additionally, range and accuracy of Lidar systems can be limited by environmental noise, cross talk between multiple Lidar sensors, and instrumental noise in the detected signal. Associating a pulse of light with scattered light that does not correspond to the pulse of light may cause the Lidar system to interpret the presence of an object, even though there is no physical object there.

SUMMARY OF THE INVENTION

A need exists for improved Lidar system for three-dimensional measurement. A further need exists for a Lidar system with encoded signals or encoded pulses of light beams to avoid cross-talk across different channels and/or interference between different Lidar systems. The provided Lidar system may address the above needs by employing an adaptive coding scheme or coding mechanism. The provided Lidar may have improved resistance to environmental noise. In particular, the coding scheme may change dynamically according real-time conditions. Different coding schemes may be selected based on an environment condition, signal condition and various others to minimize the impact of unintended signals or to better distinguish from unintended signals. Additionally, different coding schemes may be selected for improved energy efficiency. Three-dimensional imaging may be achieved by the provided Lidar system with improved accuracy and better performance.

In some aspects, a Lidar system employing adaptive coding schemes is provided. The Lidar system may comprise: at least one light source configured to emit a multi-pulse sequence to measure a distance between the Lidar system and a location in a three-dimensional environment, and the multi-pulse sequence comprises multiple pulses having a temporal profile; at least one photosensitive detector configured to detect light pulses from the three-dimensional environment; and one or more processors electrically coupled to the light source and the photosensitive detector and the one or more processors are configured to: determine a coding scheme comprising the temporal profile, wherein the coding scheme is determined dynamically based on one or more real-time conditions including an environment condition, a condition of the Lidar system or a signal environment condition; and calculate the distance based on a time of flight of a sequence of detected light pulses, wherein the time of flight is determined by determining a match between the sequence of detected light pulses and the temporal profile.

In some embodiments, the coding scheme further comprises information about a successive signal emitted by the light source. For example, the information may indicate the successive signal is multi-pulse sequence having a different temporal profile or that successive signal is a single pulse. In some embodiments, the multiple pulses are emitted within a time window having a duration of no more than 100 ns.

In some embodiments, the environment condition comprises weather, geolocation of the Lidar system or a sparsity of target objects in the environment. In some embodiments, the condition about the Lidar system comprises a power consumption or temperature of the Lidar system. In some embodiments, the signal environment condition comprises information about noise, exogenous signals or channel condition. In some cases, the signal environment condition is obtained by processing selected signals from the detected light pulses. In some embodiments, the one or more real-time conditions are obtained from one or more data sources in communication with the Lidar system or sensor data.

In some embodiments, the light source comprises: (i) a light emitting device; (ii) an energy storage element coupled to the light emitting device under the control of a switching element for generating multi-pulse sequence, and (iii) a plurality of charging units, wherein each of the plurality of charging units has a built-in switching element configured to charge the energy storage element with a pre-determined amount of energy. In some cases, the one or more processors are further configured to generate control signals to the switching element and the built-in switching element of each of the plurality of charging units. In some instances, the control signal to the built-in switching element causes a pre-determined amount of energy supplied from the corresponding charging unit to the energy storage element. The pre-determined amount of energy is used to emit the multiple pulses in a multi-pules sequence or emit one pulse in a multi-pules sequence. In some instances, the control signal to the switching element causes a sequence of electrical discharges from the energy storage element to the light emitting device thereby triggering emission of multiple pulses in a multi-pulse sequence. In some cases, the pre-determined amount of energy supplied from a first charging unit is different from the amount of energy supplied from a second charging unit. In some instances, the duration, amplitude, time intervals of the multiple pulses in a multi-pulse sequence are regulated by the control signals transmitted to the switching element or the built-in switching element.

In some embodiments, determining the match comprises comparing one or more factors extracted from the sequence of detected light pulses to the temporal profile. In some cases, the one or more factors comprise time intervals, number of pulses in a sequence, amplitude, amplitude ratio, or duration ratio. In some instances, the one or more factors are selected dynamically based at least in part on the one or more real-time conditions.

In some embodiments, a successive multi-pulse sequence is emitted prior to a pulse from the preceding sequence being reflected by the three-dimensional environment and returned to the photosensitive detector. In some embodiments, the time of flight associated with the sequence of detected light pulses is the average of the time of flight associated with each detected light pulse.

In another aspect of the invention, a method for encoding a Lidar system is provided. The method comprises: determining a coding scheme comprising a temporal profile, wherein the coding scheme is determined dynamically based on one or more real-time conditions including an environment condition, a condition of the Lidar system or a signal environment condition; emitting a multi-pulse sequence to measure a distance between the Lidar system and a location in the three-dimensional environment, wherein the multi-pulse sequence comprising multiple pulses having the temporal profile; detecting light pulses from the three-dimensional environment; determining a match between a sequence of detected light pulses and the temporal profile; and calculating the distance based on a time of flight of the sequence of detected light pulses.

In some embodiments, the temporal profile comprises on one or more members selected from the group consisting of amplitude of each pulse from the multiple pulses, duration of each pulse from the multiple pulses, time intervals among the multiple pulses and number of the multiple pulses. In some embodiments, the coding scheme further comprises information about a successive signal emitted following the multi-pulse sequence. In some cases, the successive signal is a multi-pulse sequence having a different temporal profile. In alternative cases, successive signal is a single pulse.

In some embodiments, the multiple pulses are emitted within a time window having a duration of no more than 100 ns. In some embodiments, the environment condition comprises weather, geolocation of the Lidar system or a sparsity of target objects in the environment. In some embodiments, the condition about the Lidar system comprises a power consumption or temperature of the Lidar system. In some embodiments, the signal environment condition comprises information about noise, exogenous signals or channel condition. In some cases, the signal environment condition is obtained by processing selected signals from the detected light pulses.

In some embodiments, the method further comprises comparing one or more factors extracted from the sequence of detected light pulses to the temporal profile to determine a match. In some embodiments, one or more factors comprise time intervals, number of pulses in a multi-pulse sequence, amplitude, amplitude ratio, or duration ratio. In some embodiments, the one or more factors are selected dynamically based at least in part on the one or more real-time conditions. In some embodiments, the time of flight associated with the sequence of detected light pulses is the average of the time of flight associated with each detected light pulse.

In some cases, a successive multi-pulse sequence is emitted prior to a light pulse from the preceding sequence being reflected by the three-dimensional environment and returned to the photosensitive detector. In some cases, the successive multi-pulse sequence has a different temporal profile.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure may be capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
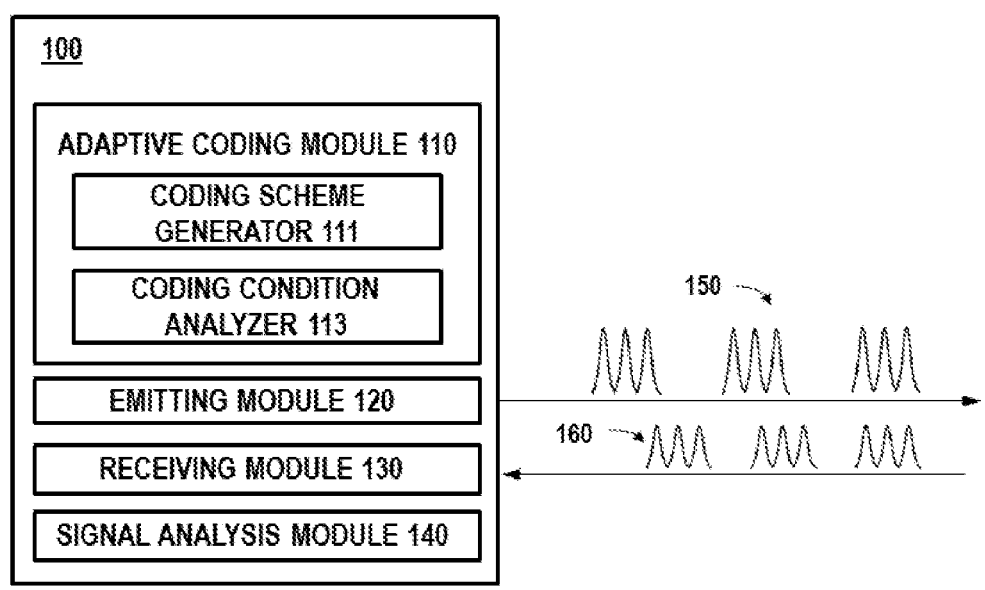
FIG. 1 schematically shows a block diagram of a Lidar system, in accordance with some embodiments of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Lidar is a type of ranging sensor characterized by long detection distance, high resolution, and low interference by the environment. Lidar has been widely applied in the fields of intelligent robots, unmanned aerial vehicles, autonomous driving or self-driving. The working principle of Lidar is estimating a distance based on a round trip time (e.g., time of flight) of electromagnetic waves between a source and a target.

Incorrect measurements may occur when an unwanted signal, signal generated by exogenous sources or other time session is correlated to a measurement signal. This may be happen when a returned signal is not distinguishable from exogenous signals or unintended signals. The exogenous signal or unintended signal may be noise signal such as a light pulse due to sun light, a solar flare or cosmic ray, signals generated by a different Lidar system, signals generated by a different laser/emitter (i.e., cross-talk between channels), and various others. For example, when a measurement pulse of light is emitted from one laser before a measurement pulse of light emitted from another laser has had time to return to the detector, it may be difficult to associate a returned signal with the measurement pulse of light. In conventional Lidar system, cross-talk among different channels of the LIDAR system may be reduced by setting a delay time or latency between each Lidar measurement to be greater than the time of flight of the measurement pulse sequence to and from an object located at the maximum range of the Lidar device, or by providing sufficient spatial separation among pairs of emitters and detectors. However, such methods are at the cost of temporal or spatial resolution.

Lidar systems and methods of the present invention may provide encoded light pulses by employing an adaptive coding scheme. In some embodiments, a sequence of multiple light pulses may be generated and encoded according to an adaptive coding scheme. The multiple light pulses may be encoded to present distinguishable signatures such that the correlation process may be simplified thereby improving measurement accuracy. The signature may be a distinct temporal profile. The multiple light pulses may be encoded by varying the time interval of pulses, number of pulses in a sequence, amplitude of a given pulse in a sequence, duration of a pulse, or any combination of the above. In some cases, a coding scheme may comprise to a temporal profile of a sequence of pulses. In some cases, the temporal profile may specify time interval of pulses in a sequence, number of pulses in a sequence, amplitude of a given pulse in a sequence, duration of a pulse in a sequence and the like. Different coding schemes may have different temporal profiles. In some cases, sequences of light pulses emitted by the same light source may have the same temporal profile such that a sequence of encoded light pulses is emitted periodically and in each cycle there is one sequence of light pulses. In some cases, sequences of light pulses emitted by the same light source may have different temporal profiles. For example, there may be two or more sequences of light pulses having different temporal profiles in a period of time. In some cases, sequences having different temporal profiles may be temporarily spaced at pre-determined time intervals according to a specific order such that consecutive sequences may not have the same temporal profile. In such cases, a coding scheme may comprise to a temporal profile of a sequence of light pulses, information about combination of multiple sequences (e.g., combination of encoded sequences and non-encoded signals, etc), information about a successive signal (e.g., a temporal profile of the successive signal, a single pulse) and other variables.

In some cases, the Lidar system may be a multi-line Lidar system. For example, the provided multi-line Lidar may produce multi-line by multiplexing the same or a group of lenses with multiple laser sources, arranged at different heights on the focal plane of the lens. This produces different directivity in the vertical direction, forming multiple lines. Traditionally, cross-talk among different channels of the LIDAR system may be reduced by setting a delay time or latency between each Lidar measurement to be greater than the time of flight of the measurement pulse sequence to and from an object located at the maximum range of the Lidar device, or by providing sufficient spatial separation among pairs of emitters and detectors. However, in order to maximize imaging resolution, it is desirable to trigger as many channels as possible, simultaneously, so that time of flight measurements may be obtained from multiple channels at the same time, rather than sequentially. The provided encoding method may enable concurrent measurements by encoding the measurement signals with distinguishable temporal profiles such that a return signal can be correctly associated with a measurement multi-pulse sequence to avoid cross-talk. For example, signals communicated by different channels may be encoded using different coding schemes.

In some cases, the coding scheme may change dynamically so as to minimize the impact of unintended signals or to better distinguish from unintended signals. For example, different coding schemes may be selected based on an environment of the signals such as collected noise signal in the environment, signals of other Lidar systems in presence, quality of returned signals, location of the Lidar system in an environment (e.g., in a cluttered or urban environment, in a sparse or rural environment, etc), complexity of an environment (e.g., sparsity of objects in the environment), weather conditions, proximity to potential obstacles, location of geographical features, location of manmade structures, and various other factors. In another example, a coding scheme may comprise pseudo-randomized temporal profile such that the chance to collect unintended signals exhibiting the same pseudo-randomized temporal profile may be lowered.

In some cases, the coding scheme may change dynamically to improve energy efficiency of the Lidar system. For example, when the Lidar system is detected to be in a less complex environment (e.g., rural place), a coding scheme with fewer pulses of light generated within a period of time may be selected over a coding scheme having a complicated temporal profile or with more pulses of light generated within a period of time. In another example, when the Lidar system is detected to be in an environment with potential objects in a longer distance away from the detector, a coding scheme may be selected to provide pulses of light with greater amplitude and lower frequency.

As utilized herein, terms "sequence of light pulses", "multi-pulse sequence", "sequence of pulses", "sequence of signals" and the like are used interchangeably throughout the specification unless context suggests otherwise. Terms "measurement signals", "measurement pulses", "measurement sequence of pulses" and the like may refer to light pulses emitted from the emitting apparatus of the Lidar system unless context suggests otherwise. Terms "echo beams", "return signals", "return pulses" and the like are used interchangeably throughout the specification unless context suggests otherwise.

FIG. 1 schematically shows a block diagram of a Lidar system 100, in accordance with some embodiments of the invention. The Lidar system 100 may be configured to be capable of generating multi-pulse sequences. In some cases, the multi-pulse sequence comprises multiple pulses which may be emitted into the surrounding environment before a return signal from any of the multiple pulses is detected. In some embodiments, an emitter of the Lidar system may emit a multi-pulse sequence having a temporal profile and a detector of the Lidar system may detect a sequence of returned light pulses at a return time. A delay time may refer to the period of time between which the sequence of light pulses leaves the emitter and the reflected sequence of light pulses is received at the receiver. The delay time may then be used to compute a distance measurement. The delay time may also be referred to as time of flight.

A sequence of light pulses may comprise multiple pulses emitted within short time duration such that the sequence of light pulses may be used to derive a distance measurement point. For example, Lidar can be used for three-dimensional (3D) imaging (e.g., 3D point cloud) or detecting obstacles. In such cases, a distance measurement associated with a sequence of light pulses can be considered a pixel, and a collection of pixels emitted and captured in succession (i.e., "point cloud") can be rendered as an image or analyzed for other reasons (e.g., detecting obstacles). A sequence of light pulses may be generated and emitted within a duration of, for example, no more than 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 µs, 2 µs, 3 µs, 4 µs, 5 µs, or more. In some cases, the time intervals between consecutive sequences may correspond to the temporal resolution of 3D imaging. The time intervals among sequences may be constant or variable. In some embodiments, a sequence of light pulses is emitted from a light source that is turned or rotated by a rotor of the Lidar system. The time duration of the sequence may be short enough such that the multiple pulses are emitted into substantially the same spot in the 3D environment or can be used to measure a distance from the Lidar system to a particular location in the 3D environment.

In some cases, a multi-pulse sequence may be emitted to a spot in a 3D environment and a successive multi-pulse sequence may be emitted to a different spot in the 3D environment. In some cases, all of the pixels (e.g., distance measurements) are obtained using multi-pulse sequences. In some cases, a selected subset of pixels is obtained using multi-pulse sequences and the remaining pixels may be obtained using un-encoded signals (e.g., single light pulse). For example, a selected subset of pixels in 3D imaging may be obtained using encoded signals such that each pixel may be generated based on a multi-pulse sequence and another subset of pixels may be obtained using un-encoded signals such that each pixel may be generated using a single light pulse. In some cases, measurement signals may be encoded at a coding frequency such that multi-pulse sequences may be interspersed with un-encoded signals at the coding frequency. For instance, a multi-pulse sequence may be followed by one or more un-encoded signals (e.g., single pulses) according to the coding frequency. In some cases, adjacent pixels in 3D imaging may be obtained using multi-pulse sequences having different temporal profiles or encoded by different coding schemes.

In some embodiments, a sequence of light pulses or multiple sequences of light pulses are generated according to an adaptive coding scheme. As shown in FIG. 1, The Lidar system 100 may comprise an adaptive coding module 110, an emitting module 120, a receiving module 130 and a signal analysis module 140. The emitting module 120 may be in communication with the adaptive coding module 110. The emitting module 120 may be configured to emit encoded light pulses 150 according to a coding scheme generated by the adaptive coding module 110. The receiving module 130 may comprise detectors and various other optical components configured to detect or collect returned light pulses or signals 160. The detected signals may be processed by the signal analysis module 140 to correlate a sequence of detected signals to an encoded sequence of light pulses. For example, the signal analysis module 140 may be or comprise a filter to identify a temporal profile in the return signals that match the temporal profile of the encoded sequence of signals thereby associating the sequence of return signals to the encoded sequence of light pulses. Details about identifying a sequence of return signals or determining a match to correlate the multi-pulse sequences are discussed later herein.

The adaptive coding module 110 may be configured to generate or determine a coding scheme that can adapt to a real-time coding condition. In some cases, the coding scheme may be changed dynamically by the adaptive coding module 110 so as to minimize the impact of unintended signals or better distinguish from other unintended signals. For example, different coding schemes may be selected based on an environment of the signals such as collected noise signal in the environment, signals of other Lidar systems in presence, quality of returned signals, location of the Lidar system in an environment (e.g., in a cluttered or urban environment, in a sparse or rural environment, etc), weather conditions, proximity to potential obstacles, location of geographical features, location of manmade structures, and various other factors. In another example, a coding scheme may comprise pseudo-randomized temporal profile such that the chance to collect unintended signals exhibiting the same pseudo-randomized temporal profile may be lowered.

In some cases, a coding scheme may be varied or selected by the adaptive coding module to improve energy efficiency of the system. For example, when the Lidar system is detected to be in a less complex environment (e.g., in a rural area), a coding scheme with fewer pulses of light generated within a period of time may be selected over a coding scheme having a complicated temporal profile or with more pulses of light generated within a period of time. In another example, when the Lidar system is in an environment with potential objects in a longer distance away from the detector, a coding scheme may be selected by the adaptive coding module 110 to provide pulses of light with greater amplitude and lower frequency.

In some embodiments, the adaptive coding module 110 may comprise a coding scheme generator 111 and a coding condition analyzer 113. The coding scheme generator 111 may be configured to determine or generate a coding scheme dynamically or in real-time. A coding scheme may comprise a temporal profile of a multi-pulse sequence. A coding scheme may comprise information about a combination of multiple sequences or information about a successive signal. A coding scheme may comprise a set of encoding parameters specifying a temporal profile and/or a combination of multiple sequences. For example, a coding scheme may comprise the time interval between pulses in a sequence, number of pulses in a sequence, amplitude of a given pulse in a sequence, duration a pulse in a sequence, temporal profiles of multiple consecutive sequences, coding frequency (i.e., combination of encoded signals and un-encoded signals), duty cycle, or any combination of the above. In some cases, a plurality of coding schemes may be stored in a database or repository. In some cases, one or more of the aforementioned coding parameters may be stored in the coding scheme database. In addition to or alternatively, a coding scheme may be selected from a plurality of coding schemes or generated in runtime according to pre-defined rules or using a predictive model built by machine learning techniques.

A coding scheme may be selected from a coding scheme repository or database. The coding scheme repository may be accessible by the adaptive coding module. The coding scheme repository may utilize any suitable database operations such as create, read, update, and delete. In another example, structured query language (SQL) or "NoSQL" database may be utilized for storing coding parameters associated with a coding scheme, metadata describing a scenario the coding scheme is generated (e.g., weather, geolocation, environment, etc), coding condition and various other data. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated. The coding scheme generator may also provide open access to external file systems, databases and data warehouses to load coding schemes.

A coding scheme may be selected from a plurality of coding schemes based on a coding condition. A coding scheme may be selected using a set of rules or a predictive model. A coding condition may comprise information about an environment of the Lidar system (e.g., geolocation of the Lidar system, weather, sparsity of target objects in the environment, distance to potential target objects, etc), the Lidar system (e.g., power consumption, temperature, etc), signal environment (e.g., noise signals, exogenous signals, channel condition, etc) and various others. Details about the coding condition are discussed later herein.

The set of rules may be hand-crafted rules or defined by users. By executing the set of rules against a current coding condition, a coding scheme may be selected or determined. For example, a coding scheme may be selected by comparing a detected signal-noise-ratio (SNR) to a pre-determined threshold, detecting a complexity of the environment (e.g., density of objects in an environment, distance to potential objects, etc), detecting a power consumption mode/level (e.g., power saving mode), extracting a signature or temporal profile of exogenous signals, obtaining local weather condition, any combination of the above and various others.

In addition to or as an alternative, a coding scheme may be determined or selected using a predictive model. The predictive model may be built utilizing machine learning techniques. For instance, the predictive model may be trained using iterative learning cycles or updated dynamically using external data sources. In an example, input data to the predictive model may be one or more coding conditions and the output may be a coding scheme.

The aforementioned coding condition may be detected and provided by the coding condition analyzer 113. The coding condition analyzer 113 may be configured to obtain real-time coding condition then transmit the coding condition to the coding scheme generator 111. As described above, a coding condition may comprise information about an environment (e.g., geographical information, weather, sparsity of target objects, distance to potential target objects, etc), the Lidar system (e.g., power consumption, temperature, etc), signal environment (e.g., noise signals, exogenous signals, channel condition, etc) and various others. The coding condition may be obtained from sensor data and/or various other data sources. For example, geographical location of the Lidar system may be obtained from location sensors disposed on the movable object that the Lidar system is attached to, temperature may be obtained from temperature sensor of the Lidar system and the like. In some cases, information about an environment such as a geographical location, complexity of the environment (e.g., urban, rural area), terrain information (e.g., paved/unpaved surfaces, roads, sidewalks, grass, dirt, gravel, flat surfaces, inclined or uneven surfaces, hills, slopes, speed bumps), weather condition and the like may be obtained from a control center of the movable object (e.g., autonomous vehicle) the Lidar system is attached to, or pulled from other data sources (e.g., Internet or public information such as map information etc). The Lidar system may, for example, comprise a wireless communication module to enable communication with the data sources and/or the movable vehicle. In another example, information about the Lidar system such as a power consumption level or power consumption mode, temperature of the Lidar system may be obtained from the controller of the Lidar system. In a further example, information about the signal condition such as SNR, channel condition and various others may be obtained from the receiving apparatus of the Lidar system. Alternatively or additionally, the signal condition may be obtained by sampling the environment. For example, sampling signals may be transmitted to the environment to test the SNR or channel condition. The sampling signals can also be used to test other coding conditions such as an environment condition of the Lidar system (e.g., distance to potential objects). The sampling signals may or may not be encoded using the same coding scheme as used for the measurement signals. The sampling signals may or may not be the same as the measurement signals. In some cases, the sampling signals may be interspersed with measurement signals. For example, the sampling signals may comprise a sequence of pulses following by one or more encoded sequences of measurement signals. In some cases, measurement signals may be sampled and used as sampling signals. For example, a sequence of pulses may be processed by the coding condition analyzer to extract signal condition or environment condition.

In some cases, a coding scheme may be generated at runtime. In some cases, the coding scheme may comprise pseudo-randomized temporal profile such that the chance to collect unintended signals exhibiting the same pseudo-randomized temporal profile may be lowered. In some cases, the coding scheme may be generated in runtime based on a detected coding condition. For example, a coding scheme may be generated to be better distinguished from exogenous signals. For instance, a signature or temporal profile of exogenous signals may be extracted and a coding scheme may be generated to have a distinct signature or temporal profile such that the encoded signals can be easily identified from the exogenous signals. In some cases, a coding scheme may be generated in response to detected distance of potential object (e.g., obtained by sampling signals). In such cases, pulses emitted to the direction corresponding to long distance may have greater amplitude or duration. In some cases, when the environment is detected to be less complex, a coding scheme with fewer pulses in a sequence may be generated. Similar to the method of selecting or determining a coding scheme, a coding scheme may be generated based on the coding condition and using a set of pre-determined rules. A coding scheme may be generated based on the coding condition and using a predictive model built by machine learning techniques in a similar process as described above.

The coding scheme may be transmitted to the emitting module 120 for generating sequences of pulses 150. The emitting module 120 may comprise a plurality of light sources. The plurality of light sources may be configured to generate laser beams or pulses of light. In some embodiments, the wavelength of the laser beam may be between 895 nm and 915 nm (e.g., 905 nm). This wavelength range may correspond to infrared light which are invisible and penetrative, which can improve the detection range of the Lidar and prevent disturbance to the environment. The wavelength of the laser beam can be in any other range depending on the specific application. In some cases, a light source may comprise at least a laser diode and a driver circuit. In some embodiments, a light source or the driver circuits may comprise a plurality of charging units controlled to emit a sequence of pulses within a short period of time or with short time intervals between sequential pulses. The sequence of pulses may have a temporal profile according to a coding scheme. Details about the electronic components and implementation of the emitting module and/or the charging unit are described later herein. Light pulses generated by the emitting module may be directed to one or more optical element such as a lens or lens assembly (e.g., one or more spherical lenses, cylindrical lenses, or aspheric lenses) for collimating or focusing light beams. The one or more lenses or one or more mirrors of the emitting apparatus of the Lidar system may be used to expand, focus, or collimate the output light beams.

The receiving module 130 may comprise a plurality of detectors configured to receive the echo beams 160. Each of the detectors may correspond to one of the lasers and may be configured to receive light originated from the corresponding laser light source. A detector may be a photoreceiver, optical receiver, optical sensor, photodetector, or optical detector. In some cases, a receiving module may include one or more avalanche photodiodes (APDs) or one or more single-photon avalanche diodes (SPADs). In some cases, a receiving module may include one or more PN photodiodes (e.g., a photodiode structure formed by a p-type semiconductor and an n-type semiconductor) or one or more PIN photodiodes (e.g., a photodiode structure formed by an undoped intrinsic semiconductor region located between p-type and n-type regions).

In some embodiments, the receiving module 120 may comprise an optical receiving device (e.g., focusing lens, focusing lens assembly), one or more optical elements (e.g., reflectors), and a plurality of detectors. The reflected light off an external object may pass through the optical receiving device and then is received by the detectors. The quantity of the detectors may be the same as that of the lasers or light sources. The received optical signals may be converted to electrical signals and processed by the signal analysis module 140.

The signal analysis module 140 may be configured to decode the return signals 160. The signal analysis module may be configured to identify encoded return signals from all the signals collected by the receiving module 130 and correlate the return signals to the sequence of measurement signals. In some cases, the signal analysis module 140 may also be configured to extract information indicating a coding condition. For example, the signal analysis module may selectively process a sequence of pulses to extract channel condition, SNR and various other conditions then transmit the results to the coding condition analyzer 113. In some cases, the signal analysis module may be configured to further process the identified return signal to calculate a measurement distance. Details regarding identifying encoded return signals and computing a measurement distance are described later herein.

Although the coding scheme generator and the coding condition analyzer are shown as separate components, the coding scheme generator and the coding condition analyzer can be integrated as a single component.

In some embodiments, multiple light pulses may be encoded by varying the time interval of pulses, number of pulses in a sequence, amplitude of a given pulse in a sequence, duration of a pulse, or any combination of the above. A temporal profile of a sequence of pulses may be determined according to a coding scheme. In some cases, a coding scheme may also include information about a combination of sequences or information about a successive/following signal. The coding scheme may, for example, specify the successive signal is an un-encoded signal (e.g., single light pulse) or an encoded sequence. For example, a coding scheme may specify a temporal profile for a first sequence and a different temporal profile for a successive sequence. In another example, a coding scheme may comprise a coding frequency. For instance, a coding scheme may comprise a coding frequency specifying that every sequence is followed by a pre-determined number of un-encoded signals (e.g., single light pulse).

Figure 2:
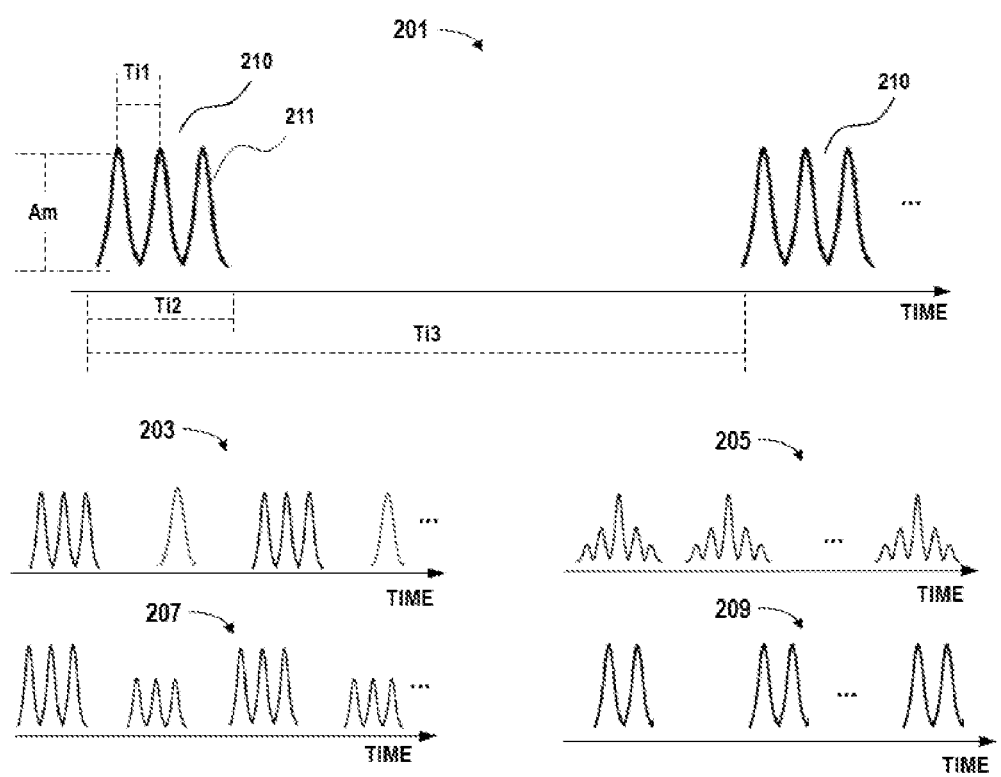
FIG. 2 shows various examples of encoded sequences of light pulses.

FIG. 2 shows examples of encoded multi-pulse sequences 201, 203, 205, 207, 209. A multi-pulse sequence 210 may comprise multiple pulses 211. A multi-pulse sequence may also be referred to as an encoded sequence (of pulses). A multi-pulse sequence may comprise any number of pulses. For example, at least one, two, three, four, five, six, seven, eight, nine, ten or more pulses may be generated within a short period of time $T_{i2}$ and form a multi-pulse sequence. The duration may be, for example, no more than 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 µs, 2 µs, 3 µs, 4 µs, 5 µs, or more. The duration $T_{i2}$ of different multi-pulse sequences may or may not be the same. In some cases, the duration $T_{i2}$ of consecutive multi-pulse sequences can be different. The number of pulses in successive multi-pulse sequences may or may not be the same. For example, there can be three pulses in a multi-pulse sequence encoded according to a coding scheme 201 and two pulses in a multi-pulse sequence encoded according to another coding scheme 209. In some cases, the number of pulses within a sequence may be used by the signal analysis module for decoding or identifying an encoded multi-pulse sequence.

The time interval $T_{i1}$ between every two consecutive pulses within a multi-pulse sequence may or may not be constant. The time interval can be, for example, no more than 1 ns, 5 ns, 10 ns, 20 ns, 30 ns, 40 ns, 50 ns, 60 ns, 70 ns, 80 ns, 90 ns, 100 ns, 200 ns, 300 ns, 400 ns, 500 ns or more. The time interval $T_{i1}$ within a multi-pulse sequence may vary. For instance, the time interval between the first pulse and second pulse may be different from the time interval between the second pulse and the third pulse. In some cases, the time interval between any two pulses may be used by the signal analysis module for decoding or identifying an encoded multi-pulse sequence. In some cases, a derivative of time interval such as a ratio between two time intervals (e.g., interval ratio) may be used for decoding or identifying an encoded multi-pulse sequence.

The multiple pulses 211 may have varied amplitude (e.g., Am) or constant amplitude within a multi-pulse sequence 210. For example, multiple pulses in a multi-pulse sequence encoded according to a coding scheme 205 may have varied amplitude. In some cases, the amplitudes of the multiple pulses may be used by the signal analysis module for decoding or identifying an encoded sequence. In some cases, a derivative of the amplitude such as ratio tween the amplitudes of any two pulses may be used by the signal analysis module for decoding or identifying an encoded sequence. The multiple pulses 211 may have varied duration within a sequence. In some cases, a temporal profile of a sequence may be defined by the number of pulses, time intervals (e.g., Ti1), duration of the sequence (e.g., Ti2), amplitude of the pulses, or a combination thereof in a sequence.

In some cases, the time interval (Ti3) between two consecutive sequences may be greater than the duration of sequence pulses (Ti2) that a successive sequence may not be emitted prior to receiving a return signal from the preceding sequence. Alternatively, the temporal profiles of two consecutive sequences are distinct such that two or more sequences of pulses can be emitted in a transmission order with shorter time interval Ti3 and the return sequences may or may not be received in the order that is the same as the transmission order. For example, the consecutive sequences as shown in the light pulses encoded according to a coding scheme 207 have distinct temporal profiles that the amplitudes of pulses in the two sequences are different. The return signals correspond to the two consecutive sequences then can be distinguished by at least the amplitude and be correlated to the measurement sequences correctly. In some embodiments, multiple sequences emitted by a light source may be individually configurable. This may advantageously provide flexibility to configure the strength (e.g., amplitude) of the sequence of signals according to the measurement distance/direction or to achieve a desired performance.

The duty cycle (e.g., ratio tween Ti2 and Ti3) may be no more than about 5%, 10%, 20%, 30% and more. The time interval Ti3 between two consecutive sequences may be, for example, no less than 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 µs, 2 µs, 3 µs, 4 µs, 5 µs, or more.

In some cases, encoded sequences of pulses may be interspersed with un-encoded signals. For example, one or more single pulses may be emitted between two multi-pulse sequences (e.g., pulses as shown in 203). This may advantageously provide a low energy consumption coding scheme. For example, when the coding condition shows that the environment has fewer objects or the noise level is low, one or more un-encoded pulses may be emitted between two encoded sequences (e.g., pulses shown in 203) or a coding scheme with fewer pulses in a sequence may be adopted (e.g., pulses shown in 209).

Return signals may be processed to identify encoded multi-pulse sequences. The identified sequence of return signals may be correlated to the corresponding measurement sequence. In some cases, the encoded multi-pulse sequence may be identified by extracting a temporal profile of a sequence of return signals and check to see if the extracted temporal profile matches a known temporal profile. In some cases, the encoded multi-pulse sequence may be identified by extracting one or more factors related to a temporal profile and a match may be determined by comparing the one or more factors of the return signals to a known temporal profile. The known temporal profile may be provided by the coding scheme generator. The temporal profile can be the same as the temporal profile as described elsewhere herein. In some cases, once a coding scheme generator 111 generates or determines a coding scheme, the coding scheme including the temporal profile may also be transmitted to the signals analysis module 140.

The temporal profile can be the same as the temporal profile as described above. The temporal profile may be defined by a plurality of factors including, but not limited to, the number of pulses, time intervals, duration of pulses, amplitude of pulses, a ratio tween amplitudes of any two pulses (e.g., amplitude ratio), a ratio between durations of any two pulses in a sequence (e.g., duration ratio), duty cycle (e.g., ratio between duration of multi-pulse sequence and time interval between sequences), and various others derivatives. In some cases, all of the factors are compared against a known temporal profile in order to determine a match. Alternatively or in addition to, one or more of the factors may be selected for determining a match. For example, time intervals and amplitude ratio extracted from a sequence of return signals may be compared to a known temporal profile to determine a match. In some cases, one or more factors may be pre-selected for determining a match. For instance, one or more factors may be pre-selected regardless of the coding scheme used for encoding the measurement signals. Alternatively or in addition to, one or more factors may be selected based on the coding scheme. For instance, upon generating or selecting a coding scheme for a given channel, one or more factors may be determined accordingly and the signal analysis module may be notified of such one or more factors. In some cases, the factors for determining a match may dynamically change. For instance, different factors may be selected based on the noise signature, channel condition, environment complexity level, or other conditions.

In some cases, the collected signal may be determined to be a legitimate sequence of signals when a match is determined. The legitimate sequence of signals may be further correlated to a sequence of measurement signals to calculate a measurement distance or time of flight of the multi-pulse sequence. In some cases, a match is determined when the selected one or more factors are determined to match. In some cases, if the level of match exceeds a predetermined threshold, then the one or more factors may be considered a match. For example, if the time intervals match by more than 60%, 70%, 75%, 80%, 85%, 90%, 95%, 97%, 99%, 99.9%, 99.99%, then the time intervals may be considered a match. In some cases, the threshold associated with different factors may be different. For instance, the time intervals and amplitude ratio of a sequence of return signals may be compared to the time intervals and amplitude ratio of the temporal profile respectively, and the time intervals may be required to reach 80% threshold while amplitude ratio may be required to reach the 70% threshold in order to be considered as a match. The threshold for determining a match in different coding schemes may or may not be the same. The threshold for determining a match may or may not change along with time. For example, the threshold can be adjusted automatically (e.g., using a machine learning model or a set of rules) or manually (e.g., upon user provided command). In some cases, a sequence of signals may be considered to be legitimate when all of the selected factors exceed the thresholds. In some cases, a sequence of signals is determined to be legitimate when at least a portion of the selected factors exceed the thresholds. For instance, when the time interval between the second pulse and the third pulse does not match the temporal profile by the threshold, the sequence of pulses may still be considered legitimate signals. Alternatively, when one factor fails meeting the threshold, the sequence of signals may not be considered as legitimate signals. In some cases, legitimate sequence of signals may be used for calculating a distance. Signals that are determined to be not legitimate may not be used for calculating a distance. In some cases, a legitimate sequence of signals may be permitted to partially match the temporal profile. For example, a legitimate sequence of signals may be permitted to have incorrect signal(s). In such cases, time of flight associated with the incorrect signal may or may not be used for calculating the distance or time of flight of the sequence. For example, only the correct return signals in the sequence are used for calculating a distance.

Figure 3:
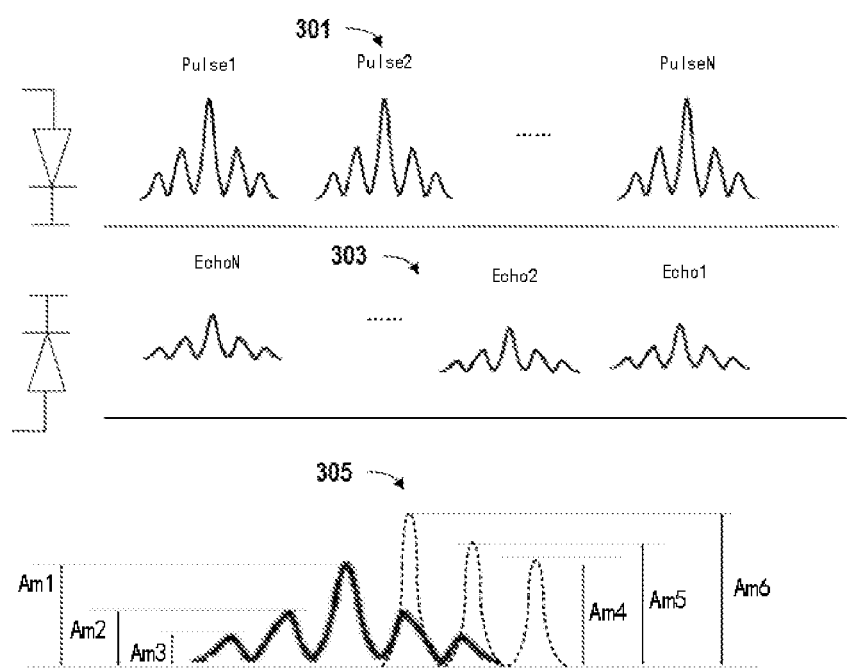
FIG. 3 shows an example of identifying legitimate sequence of light pulses from return signals.

FIG. 3 shows an example of identifying legitimate sequence of light pulses from collected return signals. In the illustrated example, the emitted measurement signals may be a multi-pulse sequence 301 having varied amplitude. The temporal profile of the measurement signals may be stored in a memory unit and used for identifying legitimate sequence of light pulses. The return signals corresponding to the multi-pulse sequence are shown as signals 303. In some cases, one or more factors (e.g., amplitude, number of pulses) of the temporal profile may be stored and used for determining a legitimate sequence of light pulses. For example, amplitudes, number of pulses in a sequence and the like may be used to determine a match. In some cases, the return signals 303 may preserve the ratio of amplitudes better than the value of amplitude. In such cases, the ratio of amplitudes may be used to determine a match or mismatch. In some instances, the return signals 305 detected by a detector may be a result of encoded signals (e.g., multiple-pulse sequence shown as solid lines) combined with other signals (e.g., signals of an adjacent sequence, noise signals, etc shown as dotted lines). The return signals collected by the detectors may be processed or filtered to determine a match. For instance, the number of pulses detected within a time window may be compared to a temporal profile to determine a match. In the illustrated example, the return signals 305 collected within a time window may be determined not match the known temporal profile in response to detecting the number of pulses (e.g., six pulses) not match the number of pulses (e.g., five pulses) specified in the known temporal profile. Alternatively or in addition to, other factors such as the amplitudes of return signals (Am1, Am2, Am3, Am4, Am5, Am6) may be compared to the temporal profile to determine a match. In the illustrated example, the return signals having the amplitudes Am4, Am5, Am6 are determined not match the temporal profile because the amplitudes Am4, Am5, Am6 do not match the amplitudes of the fourth and fifth pulses in the temporal profile. In some cases, the return signals corresponding to amplitudes Am4, Am5, Am6 may be referred to as incorrect signals. In some cases, upon determining one or more return signals not match the corresponding a temporal profile or to be incorrect signals, the entire sequence of return signals (received within a time window) including such incorrect return signals may be discarded. For example, return signals corresponding to amplitudes Am4, Am5, Am6 in the sequence of return signals 305 are determined to be incorrect signals, then the entire sequence of return signals 305 may be discarded. In alternative cases, when a sequence of return signals partially match the temporal profile, the sequence of return signals may still be used for calculating a distance. For example, return signals corresponding to amplitudes Am4, Am5, Am6 are detected to be incorrect signals while return signals corresponding to amplitudes Am1, Am2, Am3 are determined to match part of the temporal profile (e.g., first three pulses), in such cases, return signals corresponding to amplitudes Am1, Am2, Am3 may be associated to the first three pulses and used for calculating a distance or TOF.

Figure 4:
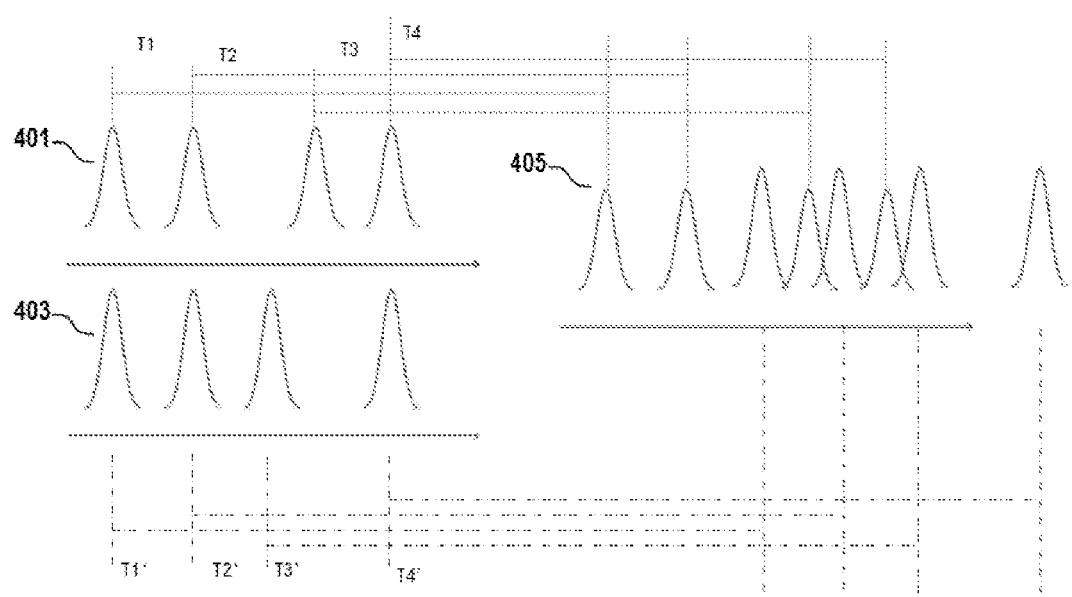
FIG. 4 shows an example of two multi-pulse sequences having different temporal profiles.

When a sequence of signals are determined to be legitimate, the sequence of signals may be correlated to a sequence of measurement signals to calculate a measurement distance or time of flight. FIG. 4 shows an example of two multi-pulse sequences 401, 403 having different temporal profiles. The two multi-pulse sequences 401, 403 may be encoded by different coding schemes. As shown in the example, the two multi-pulse sequences may be different in at least the amplitude and time intervals. The two multi-pulse sequences may be emitted simultaneously or have temporal overlap. The collected return signals 405 associated with the two multi-pulse sequences may also have temporal overlap. The provided decoding method may be capable of identifying a sequence of return signals from the collected return signals 405. The decoding method can be the same as the decoding method as described above. In some cases, the identified sequence may then be correlated to the original multi-pulse sequence. A delay time or time of flight for each pulse within the sequence may be obtained. For example, the time of flight associated with each pulse in the multi-pulse sequence 401 may be determined T1, T2, T3, and T4, and the time of flight (TOF) associated with each pulse in multi-pulse sequence 403 may be determined as T1', T2', T3', and T4'. In some cases, a distance may be calculated using the time of flight associated the multi-pulse sequence. In some cases, the time of flight associated with the multi-pulse sequence may be determined using the average of time of flight associated with each pulse within a sequence. A distance may be calculated according to below formula:

$$S = \frac{\sum_{n=1}^{k} tn}{2n} c,$$

where S represents the distance, k represents number of pulses in a sequence, t represents time of flight associated with a pulse, and c represents speed of light. Different method or additional processes may be employed to obtain time of flight associated with a sequence of pulses. For example, when an incorrect pulse is detected then such incorrect pulse may be excluded from being used for calculating the time of flight of the sequence. The incorrect pulse may be detected by detected an outlier time of flight deviating from the time of flight associated with other pulses.

The functions, methods or the one or more components described such as coding scheme generator, coding condition analyzer, signal analysis module may be implemented using software, hardware or firmware or a combination thereof. In some embodiments, the components such as coding scheme generator, coding condition analyzer, signal analysis module may comprise one or more processors and at least one memory for storing program instructions. The processors may be onboard the Lidar system. Alternatively, the processors may be external to the Lidar system but in communication with the Lidar system. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. The coding scheme generator may be a standalone device or system that is in communication with the Lidar system. Alternatively, the coding scheme generator may be a component of the Lidar system. The methods disclosed herein such as decoding method and/or adaptive coding scheme generation processes can be implemented in hardware components or combinations of hardware and software such as, for example, ASICs, special purpose computers, or general purpose computers.

A multi-pulse sequence may have configurable time intervals, amplitudes, duration of a pulse and the like. In some cases, consecutive sequences may be individually configurable. The provided Lidar system may comprise an emitting module that is capable of generating individually configurable light pulses within a short period of time and/or generating individually configurable sequential or successive sequences. In some embodiments, the emitting module may comprise a plurality of light sources. In some cases, a light source may comprise at least a laser diode and a driver circuit. In some embodiments, a light source may be controlled to emit a multi-pulse sequence within a time window having a short duration or with short time intervals between sequential pulses.

Figure 5:
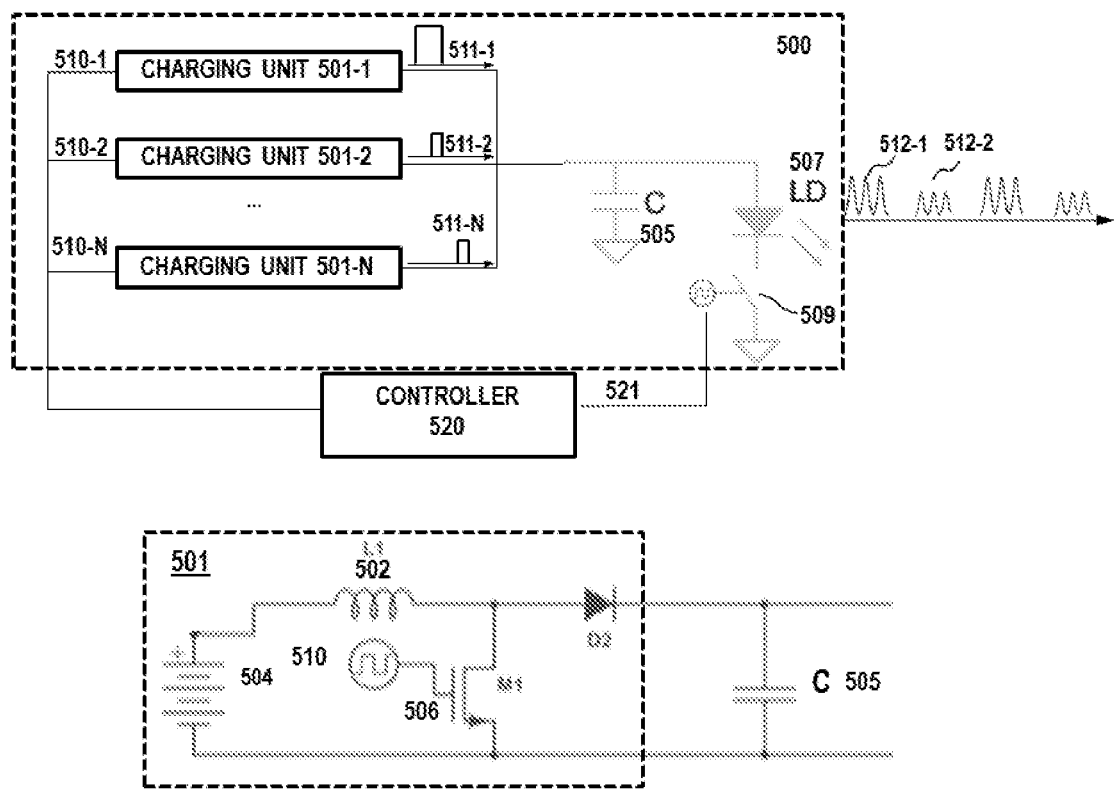
FIG. 5 schematically shows an exemplary light source, in accordance with some embodiments of the invention.

FIG. 5 schematically shows a light source 500, in accordance with some embodiments of the invention. The light source 400 may comprise a light emitting device such as laser diode 507 electrically coupled to an energy storage element 505. The energy storage element 505 can be any suitable component such as a capacitor. The light source 500 may comprise a plurality of charging units 501-1, 501-2, . . . , 501-N electrically coupled to the energy storage element 505. Any number of charging units may be included in a light source 500. For example, at least one, two, three, four, five, six, seven, eight, nine, ten or more charging units may be included. The plurality of charging units may be configured to charge the energy storage element 505 sequentially or collectively. The plurality of charging units may be controlled to provide an amount of electrical energy to the energy storage element 505 in response to control signals generated by a controller.

In some embodiments, each charging unit may have built-in voltage regulator and switching element to control the timing and the amount of energy supplied to the capacitor 505. For example, the amount of energy supplied to the capacitor 505 may be pulse energy and the duration of the pulse may be controlled by the charging unit. In the illustrated example of a charging unit 501, an energy source 504 may supply electrical energy to a built-in energy storage unit 502 (e.g., inductor). The energy source may be an energy source shared by and/or coupled to the plurality of charging units. The charging unit 501 may also comprise a built-in switching element 506 for controlling the timing and the amount of energy supplied to the capacitor 505. In some cases, this may be achieved by internally switching a transistor (or power MOSFET) between its "ON" state (saturated) and its "OFF" state (cut-off). In some cases, the amount of energy supplied to the capacitor 505 may be controlled by controlling the duration of the energy pulse. The switching element 506 may operate in response to control signal 510. In some instances, utilizing a charging unit having a built-in switching element and an inductor, in conjunction with a capacitor (e.g., energy storage element 505) may advantageously ensure a regulated output laser power thereby providing eye safety.

The control signal 510 may be generated by a controller 520. In some embodiments, control signals 510-1, 510-2, . . . , 510-N generated by the controller 520 may be used to control the plurality of charging units 501-1, 501-2, . . . , 501-N to supply energy to the capacitor 505 sequentially or simultaneously. The amount of energy or pulse energy supplied by a charging unit can be additive. For example, two or more charging units may supply energy to the energy storage element 505 simultaneously. Two or more charging units may supply energy to the energy storage element sequentially or continuously with or without temporal overlap. This may beneficially shorten the time taken to charge the energy storage element 505 in a controlled manner.

In some cases, the amount of energy or pulse energy supplied by a charging unit may be used to generate a single pulse in a multi-pulse sequence. For example, the plurality of charging units may be controlled by the control signals 510-1, 510-2, . . . , 510-N to supply energy 511-1, 511-2, 511-N to the capacitor sequentially that each amount of energy may correspond to a pulse in a multi-pulse sequence. In some cases, the amount of energy supplied by a charging unit may be used to generate multiple pulses. For example, the capacitor 505 may be charged by the amount of energy 511-1 supplied from charging unit 501-1, and a switching element 509 may be used to trigger the discharge of capacitor to allow energy (e.g., current) flowing to the light emitting device 507 thereby generating multiple pulses. The switching element 509 may operate in response to control signals 521 generated by the controller 520. The control signal 521 generated by the controller 520 to the switching element may cause a sequence of electrical discharges from the energy storage element 505 to the light emitting device 507 thereby emitting multiple pulses in a multi-pulse sequence.

The switching element 509 may be configured to toggle between two states depending on the state of a control signal 521. For example, in a first state (e.g., "OFF" state), a switching element may be substantially non-conductive. In this state, a capacitor 505 is effectively disconnected from the light emitting device 507. In the "OFF" state, the capacitor may be charged by one or more of the plurality of charging units. In a second state (e.g., "ON" state), the switching element may be substantially conductive. In this state, the capacitor is electrically coupled to the light emitting device 507. In the "ON" state, electrical energy flows from the capacitor to the light emitting device 507 thereby generating a light pulse.

One or more factors such as an amplitude of a light pulse, duration of a light pulse, time intervals between pulses, and number of pulses may be controlled by the control signals 521 to the switching element 509, the control signals to the plurality of charging units 510-1, 510-2, . . . 510-N or a combination of both. The provided emitting module may also allow for varying consecutive multi-pulse sequences. The consecutive multi-pulse sequences may be varied in amplitude, durations of light pulses, time intervals and like. In some cases, the amplitude of light pulses in a multi-pulse sequence may be controlled by the amount of energy (e.g., duration of an energy pulse) supplied to the capacitor. For instance, a first amount of energy (e.g., energy pulse 511-1) may be supplied to the capacitor from a first charging unit (e.g., charging unit 510-1), then the switching element 509 may be controlled to discharge the capacitor rapidly to generate a first sequence of pulses (e.g., sequence 512-1). Next, a second amount of energy (e.g., energy pulse 511-2)

may be supplied to the capacitor from a second charging unit (e.g., charging unit 510-2) and the capacitor may be discharged rapidly to generate a second sequence of pulses (e.g., sequence 512-2). The duration of energy pulses 511-1, 511-2 may be different resulting in different amplitudes of pulses in the two consecutive multi-pulse sequences. In addition to or alternatively, each energy pulse 511-1, 511-2, 511-N may correspond to a single light pulse in a multi-pulse sequence.

In some cases, the controller 520 may implement or comprise the adaptive coding module as described elsewhere herein. In some cases, the adaptive coding module may be implemented by a separate component (e.g., one or more processors) and the controller 520 may be in communication with the adaptive coding module. For example, the controller 520 may generate control signals in response to a coding scheme received from the adaptive coding module.

In some cases, the controller 520 may implement or comprise the signal analysis module as described elsewhere herein. In some cases, the signal analysis module is implemented by a separate component (e.g., one or more processors) and the controller 520 is in communication with the signal analysis module.

The controller 520 may be in communication with a plurality of light sources and/or detectors of the Lidar system. The control signals for controlling the charging units and the switching element of a given light source may be generated according to a coding scheme determined for the given light source.

Figure 6:
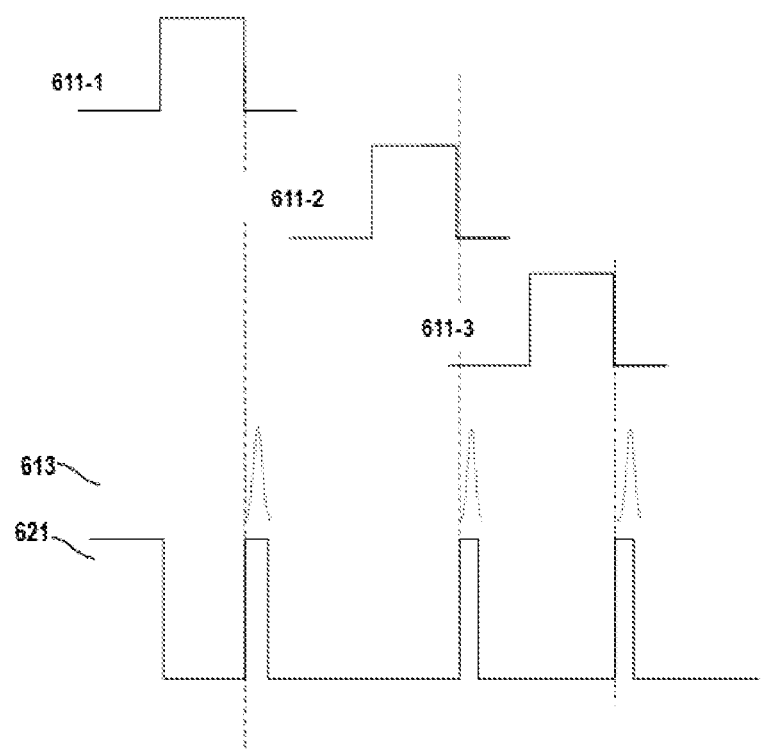
FIG. 6 shows an example of a sequence of pulses generated in response to control signals.

FIG. 6 shows an example of a multi-pulse sequence 613 generated in response to control signals 621. The control signals 621 may be generated to control the switching element (e.g., switching element 509) of a light source. In the illustrated example, energy pulses 611-1, 611-2, 611-N may be supplied to the energy storage element (e.g., capacitor) sequentially. Timing and/or the amount of energy supplied from a charging unit to the energy storage element may be controlled in response to a control signal as described in FIG. 5. In some cases, following each energy pulse, a control signal may be generated to the switching element of the light source thereby triggering emission of a light pulse. In such case, each pulse of energy may correspond to a light pulse in a sequence. In the illustrated example, a light pulse may be emitted immediately following an energy pulse. Alternatively, the light pulse may be emitted at a delayed time controlled by the control signal 621. In some cases, following each energy pulse, multiple control signals may be generated to trigger multiple operations of the switching elements. In such case, each pulse of energy may correspond to multiple light pulses. The multiple light pulses may be a multi-pulse sequence having a temporal profile. The multiple light pulses may be a portion of light pulses in a multi-pulse sequence.

The provided coding method and mechanism can be utilized in conjunction with various Lidar systems. The Lidar system may comprise at least a light source and a detector. In some cases, the Lidar system may be a multi-line Lidar employing multiple pairs of emitter/detector. A multi-line Lidar may provide benefits of achieving a large field of view or greater resolution. A large area scan can be achieved by rotating Lidar and thereby rotating the vertical field of view with the Lidar. In some cases, the multiple pairs of emitter/detector may be arranged into arrays.

Figure 7:
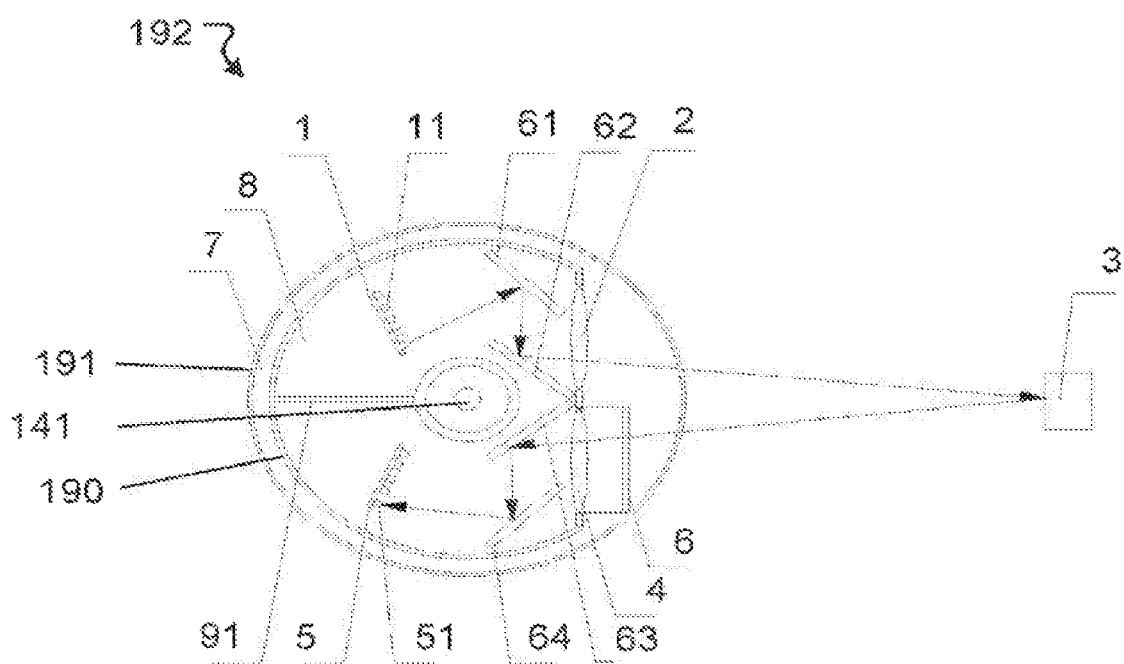
FIG. 7 is a simplified structural diagram of a Lidar system, consistent with various embodiments of the present disclosure.

FIG. 7 is a simplified structural diagram of a Lidar system 192, consistent with various embodiments of the present disclosure. In various embodiments, the exemplary Lidar 192 may comprise: a rotor 190 and a stator 191 separated by an outer cavity 7. The rotor 190 may rotate about the rotating shaft 141, that is, rotate with respect to the stator 191. The rotor 190 may include an inner cavity 8. The inner cavity 8 may be separated into an emitting cavity (the upper half of the inner cavity 8 above a separation board 91) and a receiving cavity (the lower half of the inner cavity 8 below the separation board 91), for example, by using the separation board 91. In the emitting cavity, a plurality of lasers 11 may be disposed, and in the receiving cavity a plurality of detectors 51 may be disposed.

The rotor 190 may comprise a first reflector 61, a second reflector 62 and an optical emitting device 2. The angle between the first reflector 61 and the laser beams emitted by the lasers 11 may be an acute angle, that is, the first reflector 61 may be disposed obliquely relative to the supporting body 1. The measurement light pulse (the laser beams emitted by the lasers until reaching a target) may be sequentially reflected by the first reflector 61 and the second reflector 62 and then passes through the optical emitting device 2. The measurement light pulse emitted by the lasers 11 may pass through the optical emitting device 2 (e.g., collimation lens, collimation lens assembly) and then irradiate on an external object 3. The measurement light pulse may be a multi-pulse sequence encoded by a coding scheme as described elsewhere herein.

In some embodiments, the rotor 190 may further comprise a light filtering device 6 (e.g., light filter). The light filtering device 6 may be disposed outside the inner cavity 8 for filtering out ambient light. The light filtering device 6 may be disposed on a light path of reflected light off the external object 3 and may be located upstream of an optical receiving device 4.

In some embodiments, the receiving cavity may comprise the optical receiving device 4 (e.g., focusing lens, focusing lens assembly), a third reflector 63, a fourth reflector 64, and a plurality of detectors 51. The reflected light off the external object 3 passes through the optical receiving device 4 and then is received by the detectors 51. An angle between the third reflector 63 and the principal axis of the optical receiving device 4 may be an acute angle. The reflected light that passes through the optical receiving device 4 may be sequentially reflected by the third reflector 5 and the fourth reflector 64 and then is received by the detectors 51. The detectors 51 may be fixed on a circuit board 5 or an alternative structure. The quantity of the detectors 51 may be the same as that of the lasers 11.

In some embodiments, the plurality of lasers 11 may emit a plurality of laser beams. The plurality of laser beams may include a multi-pulse sequence as described above. For example, a No. 1 laser emits a multi-pulse sequence, which sequentially passes through a first reflector 61 and a second reflector 62 and then is incident on an optical emitting device 2, and irradiates on an external object 3 after being collimated by the optical emitting device 2. Reflected light off the external object 3 converges after passing through the optical receiving device 4, and then is sequentially reflected by a third reflector 63 and a fourth reflector 64 onto detectors 51. In summary, the multi-pulse sequence emitted by the No. 1 laser is reflected by the external object 3, passes through the optical receiving device 4, and then converges to a No. 1 detector.

In some embodiments, the detectors 51 may detect the reflected light as optical signals, and correspondingly generate electrical signals based on the detection. The Lidar may further comprise an analysis device configured to processes the electrical signals generated by the detector 51 to detect the external object 3, such as an obstacle. In some embodiments, the analysis device may comprise a signal analysis module as described elsewhere herein.

In some embodiments, the rotor may comprise an emitting cavity for disposing the lasers and a receiving cavity for disposing the detectors. The emitting cavity and the receiving cavity may be separated by a separation board. The emitted laser beams may be reflected by a first and a second reflectors and pass through an optical emitting device to exit the Lidar. The reflected light, after entering the Lidar, may pass through an optical receiving device and may be reflected by a third and a fourth reflectors reflected by two reflectors to reach the detectors.

The provided Lidar system may be provided on a movable object to sense an environment surrounding the movable object. Alternatively, the Lidar system may be installed on a stationary object.

A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal.

In some cases, the movable object can be an autonomous vehicle which may be referred to as an autonomous car, driverless car, self-driving car, robotic car, or unmanned vehicle. In some cases, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In some instances, the Lidar systems may be integrated into a vehicle as part of an autonomous-vehicle driving system. For example, a Lidar system may provide information about the surrounding environment to a driving system of an autonomous vehicle. In an example, the Lidar system may provide a 360 degree horizontal field of view of the vehicle. An autonomous-vehicle driving system may include one or more computing systems that receive information from a Lidar system about the surrounding environment, analyze the received information, and provide control signals to the vehicle's driving systems (e.g., steering wheel, accelerator, brake, or turn signal).

As used herein A and/or B encompasses one or more of A or B, and combinations thereof such as A and B. It will be understood that although the terms "first," "second," "third" etc. are used herein to describe various elements, components, regions and/or sections, these elements, components, regions and/or sections should not be limited by these terms. These terms are merely used to distinguish one element, component, region or section from another element, component, region or section. Thus, a first element, component, region or section discussed herein could be termed a second element, component, region or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A system for determining a coding scheme for a laser range and detection system, the system comprising:
   (i) a memory for storing a set of program instructions, and
   (ii) one or more processors configured to execute the set of program instructions to:
   (a) detect one or more real-time conditions during operation of the laser range and detection system, wherein the one or more real-time conditions comprise at least one condition selected from the group consisting of a power consumption of the laser range and detection system, a temperature of the laser range and detection system, a signal channel condition, a weather and geolocation of the laser range and detection system and a sparsity of objects in a three-dimensional environment detectable by the laser range and detection system; and
   (b) determine, based at least in part on the one or more real-time conditions, a coding scheme from a plurality of coding schemes for generating a control signal to a light source of the laser range and detection system, wherein the control signal causes the light source to emit a sequence of light pulses to the three-dimensional environment according to the coding scheme.

2. The system of claim 1, wherein the coding scheme comprises a temporal profile including one or more members selected from the group consisting of an amplitude of each light pulse from the sequence of light pulses, a duration of each light pulse from the sequence of light pulses, a time interval between consecutive light pulses and a number of the light pulses in the sequence of light pulses.

3. The system of claim 1, wherein at least one time interval between two consecutive light pulses in the sequence of light pulses is no more than 30 nanoseconds.

4. The system of claim 1, wherein at least one of the one or more real-time conditions is detected by sampling signals selected from light pulses returned from the three-dimensional environment.

5. The system of claim 1, wherein the signal channel condition comprises information about noise or exogenous signals.

6. The system of claim 1, wherein the light source comprises: (i) a light emitting device; (ii) an energy storage element coupled to the light emitting device under the control of a switching element for generating multi-pulse sequence, and (iii) a plurality of charging units, wherein each of the plurality of charging units has a built-in switching element configured to charge the energy storage element with a pre-determined amount of energy.

7. The system of claim 6, wherein the control signal controls the switching element and the built-in switching element of the plurality of charging units.

8. The system of claim 7, wherein the control signal controlling the built-in switching element causes the pre-determined amount of energy supplied from the corresponding charging unit to the energy storage element.

9. The system of claim 7, wherein the control signal controlling the switching element causes a sequence of electricity to be discharged from the energy storage element to the light emitting device, thereby triggering emission of the sequence of the light pulses.

10. The system of claim 1, wherein the coding scheme is determined according to a predictive model.

11. A method for determining a coding scheme for a laser range and detection system, the method comprising:
(a) detecting one or more real-time conditions during operation of the laser range and detection system, wherein the one or more real-time conditions comprise at least one condition selected from the group consisting of a power consumption of the laser range and detection system, a temperature of the laser range and detection system, a signal channel condition, a weather and geolocation of the laser range and detection system and a sparsity of objects in a three-dimensional environment detectable by the laser range and detection system; and
(b) determining, based at least in part on the one or more real-time conditions, a coding scheme from a plurality of coding schemes for generating a control signal to a light source of the laser range and detection system, wherein the control signal causes the light source to emit a sequence of light pulses to the three-dimensional environment according to the coding scheme.

12. The method of claim 11, wherein the coding scheme comprises a temporal profile including one or more members selected from the group consisting of an amplitude of each light pulse from the sequence of light pulses, a duration of each light pulse from the sequence of light pulses, a time interval between consecutive light pulses and a number of the light pulses in the sequence of light pulses.

13. The method of claim 11, wherein at least one time interval between two consecutive light pulses in the sequence of light pulses is no more than 30 nanoseconds.

14. The method of claim 11, wherein at least one of the one or more real-time conditions is detected by sampling signals selected from light pulses returned from the three-dimensional environment.

15. The method of claim 11, wherein the signal channel condition comprises information about noise or exogenous signals.

16. The method of claim 11, wherein the light source comprises: (i) a light emitting device; (ii) an energy storage element coupled to the light emitting device under the control of a switching element for generating multi-pulse sequence, and (iii) a plurality of charging units, wherein each of the plurality of charging units has a built-in switching element configured to charge the energy storage element with a pre-determined amount of energy.

17. The method of claim 16, wherein the control signal controls the switching element and the built-in switching element of the plurality of charging units.

18. The method of claim 17, wherein the control signal controlling the built-in switching element causes the pre-determined amount of energy supplied from the corresponding charging unit to the energy storage element.

19. The method of claim 17, wherein the control signal controlling the switching element causes a sequence of electricity to be discharged from the energy storage element to the light emitting device, thereby triggering emission of the sequence of the light pulses.

20. The method of claim 11, wherein the coding scheme is determined according to a set of pre-determined rules or using a predictive model.

* * * * *